(12) United States Patent
Heikkinen

(10) Patent No.: US 7,333,840 B2
(45) Date of Patent: Feb. 19, 2008

(54) MOBILE COMMUNICATION TERMINAL

(75) Inventor: Jari J. Heikkinen, Espoo (FI)

(73) Assignee: Nokia Corporation, Espoo (FI)

( * ) Notice: Subject to any disclaimer, the term of this patent is extended or adjusted under 35 U.S.C. 154(b) by 31 days.

(21) Appl. No.: 11/113,803

(22) Filed: Apr. 25, 2005

(65) Prior Publication Data

US 2006/0240879 A1   Oct. 26, 2006

(51) Int. Cl.
*H04M 1/00* (2006.01)
(52) U.S. Cl. .............. 455/575.3; 455/575.4; 455/566; 455/575.1; 379/433.04; 379/433.13; 379/433.12
(58) Field of Classification Search ............ 455/575.3, 455/575.4, 566, 575.1; 379/433.04, 433.13, 379/433.16
See application file for complete search history.

(56) References Cited

U.S. PATENT DOCUMENTS

| | | | | |
|---|---|---|---|---|
| 5,485,517 A | | 1/1996 | Gray | ........................ 379/433 |
| 5,528,328 A | * | 6/1996 | O'Farrill et al. | ............. 396/544 |
| 7,010,327 B1 | * | 3/2006 | Griffith et al. | .............. 455/564 |
| 7,047,053 B2 | * | 5/2006 | Lee | .......................... 455/575.3 |
| 2003/0203747 A1 | * | 10/2003 | Nagamine | ................ 455/575.3 |
| 2004/0203517 A1 | * | 10/2004 | Park et al. | ................. 455/90.3 |
| 2005/0124392 A1 | * | 6/2005 | Jeong | ...................... 455/575.1 |
| 2006/0030835 A1 | * | 2/2006 | Sherman et al. | ............ 604/526 |
| 2006/0074442 A1 | * | 4/2006 | Noriega et al. | ............. 606/159 |

FOREIGN PATENT DOCUMENTS

GB   2 387 063 A   10/2003

* cited by examiner

*Primary Examiner*—George Eng
*Assistant Examiner*—Muthuswamy G. Manoharan
(74) *Attorney, Agent, or Firm*—Perman & Green, LLP

(57) ABSTRACT

An improved mobile communication terminal (100) is obtained, which is easy to operate while protecting the main display (102) when not in use. This is realized in the invention by letting the display body part, i.e. the first body part (101), to be located within the main body part, i.e. the second body part (103), while in a first relative position, i.e. a closed state. This significantly reduces the risk of having the display (102) being subjected to dust and scratches. When the mobile communication terminal is in the open state, i.e. the second relative position, the display (102) is fully visible to provide a rich user interface.

7 Claims, 9 Drawing Sheets

MOBILE COMMUNICATION TERMINAL

FIELD OF THE INVENTION

The present invention relates to a mobile communication terminal, and specifically to an improved mobile communication terminal comprising two body parts that are configured to be in at least two separate positions with respect to each other.

BACKGROUND

Mobile phones have changed dramatically in the last decade. With the first 2G phones the only real purpose of the phones were to make normal phone calls. Now with 2.5G (GPRS), CDMA2000 and UMTS technology, coupled with large color displays and integrated peripherals such as cameras and MP3 players, the phones have evolved to true multimedia entertainment terminals. This brings a whole new set of problems to be solved, not the least in the mechanical manifestation.

A general problem of mobile phones is that they should be small when not in use to be convenient to carry around, while at the same time they should have large displays to allow delivery of rich content and a keyboard that is large enough to use. This problem has been attempted with several different solutions with varying degree of success in the past.

One known way to deal with this problem is a phone that of what is called a clamshell type, implying that it comprises two main parts—one keyboard part and one display part, joined together by a hinge, allowing the phone to open and close much like a book. A problem with this type of phone is the complexity involved in opening or closing the phone. This is awkward and either requires two hands or a one hand operation with a large risk of dropping the phone.

Moreover there is the swivel type of phone. This type of phone is disclosed in U.S. Pat. No. 5,485,517. This type of phone also has a keyboard part and a display part but is opened using a swivel motion. However, a drawback relating to this type of phone is that the display is always exposed, leading to an enhanced risk of obtaining scratches and dust in the display, for example when the user carries the phone in a pocket or handbag.

A more complex type of phone is disclosed in GB 2 387 063 A. Using a biaxial hinge the phone can be opened and closed in a multitude of ways. While this does provide a way to have a protected display in closed state, it does not provide an easy means for the user to open and close the phone.

SUMMARY OF THE INVENTION

An object of the present invention is hence to overcome drawbacks related to mobile communication terminals according to prior art.

The object is achieved by means of a mobile communication terminal according to the appended claims.

That is, a mobile communication terminal according to the present invention comprises a first body part and a second body part that are configured to be in at least a first relative position with respect to each other and a second relative position with respect to each other. The second body part comprises a cavity capable of containing the first body part. The first relative position is such that at least part of the first body part is contained in the cavity of the second body part and the second relative position is such that the first body part is substantially outside the cavity of the second body part.

That is, a mobile communication terminal is obtained, which is easy to operate while protecting the main display when not in use. This is realized in the invention by letting the display body part, i.e. the first body part, to be located within the main body part, i.e. the second body part, while in a first relative position, i.e. a closed state. This has the advantage of significantly reducing the risk of having the first body part being subjected to dust and scratches. This is particularly advantageous when, as in preferred embodiments, the first body part comprises a display and/or a camera. When the terminal is in the open state, i.e. the second relative position, the camera is uncovered and the display is fully visible to provide a rich user interface.

Preferably, the first and the second body parts each have a first surface and a second surface. The surfaces faces in essentially opposing directions and the second relative position is such that the first surface of the first body part and the first surface of the second body part are essentially in a common plane. In other words, the terminal is preferably realized such that in opened state the front surface, i.e. the first surface, of the display body part is in the same plane as the front surface of the main body part, providing a straight surface with the advantage of no body part edges disturbing the view or use of the phone.

Alternatively, the second relative position is such that the second surface of the first body part and the second surface of the second body part are essentially in a common plane. That is, the back surface, i.e. the second surface, of the display body part and the back surface of the main body part are in the same plane, having the advantage of creating one stable back surface on which the terminal can rest, e.g. on a table.

In a preferred embodiment, the first body part and the second body part are mechanically attached to each other such that the first and second body parts are capable of being rotated relative each other to allow a shift between the first and second relative positions. The rotational capability may be provided by means of a shaft comprising a threaded screw having a non-linear pitch. The rotational capability may alternatively be provided by means of a shaft having at least one eccentric end.

In another preferred embodiment, the first body part and the second body part are mechanically attached to each other such that the first and second body parts are capable of being moved along essentially one direction relative each other to allow a shift between the first and second relative positions. That is, the transition between opened and closed states may also be provided by way of linear movement of the body parts.

Preferably, spring means are arranged in connection with the first and the second body part for storing energy during shifting the body parts from the second to the first relative position and to release energy during a shift from the first to the second relative positions and thereby facilitating the shift. That is, when the user closes the phone the spring will store mechanical energy which is prevented to be released with a locking mechanism. On opening the phone, the locking mechanism is released and the mechanical energy is used to automatically displace the display body part to full open position.

BRIEF DESCRIPTION OF THE DRAWINGS

The present invention will be more apparent from the accompanying drawings, provided as non-limiting examples.

DETAILED DESCRIPTION OF PREFERRED EMBODIMENTS

Figure 1:
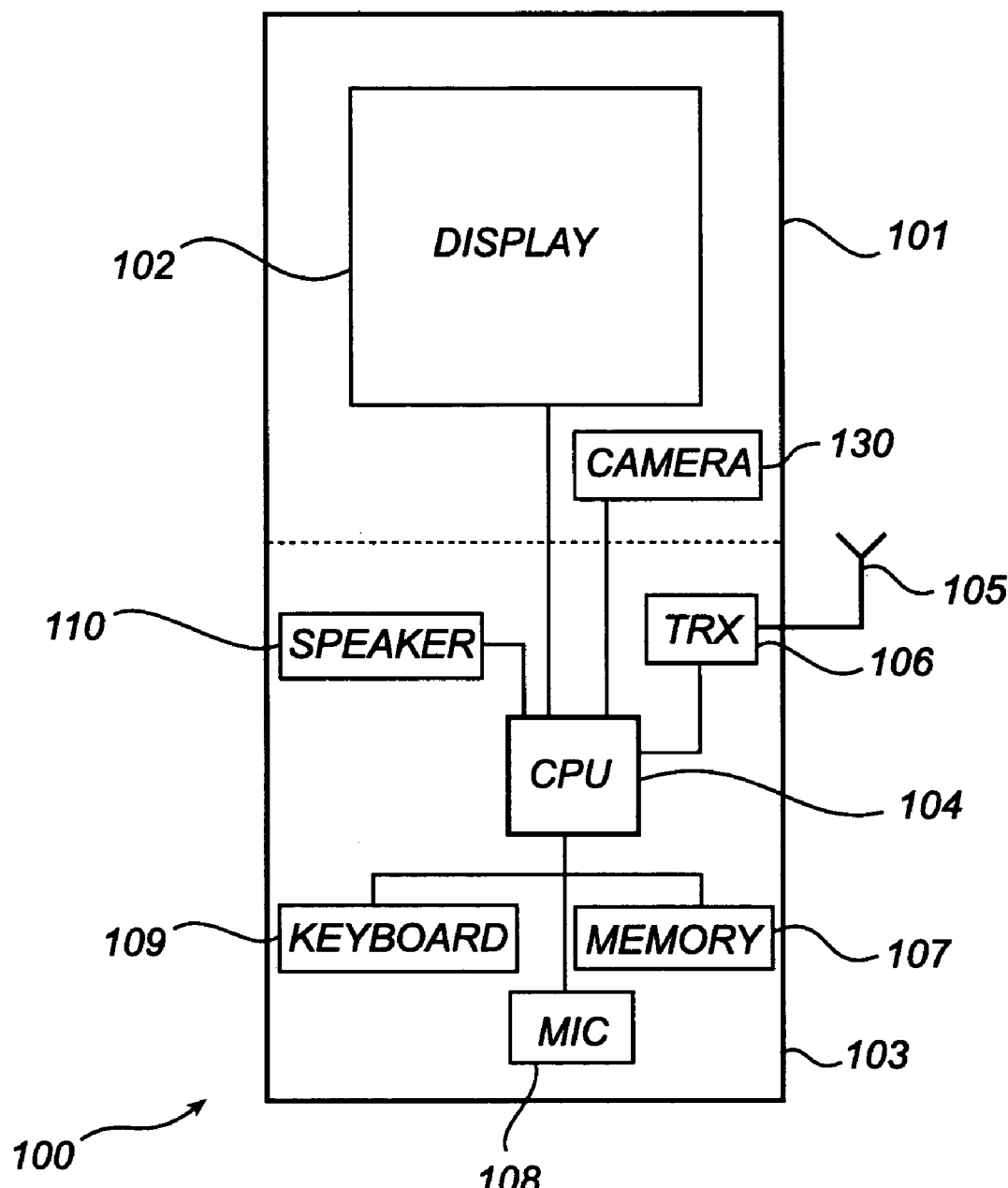
FIG. 1 shows a block diagram of a mobile communication terminal according to the present invention.

FIG. 1 shows a block diagram of a mobile communication terminal 100 according to the present invention. A first body part 101 comprises a display 102 and a camera 130. Attached, e.g. via a rotational joint or any other mechanical connecting means as will be exemplified below, to the first body part is a second body part 103, comprising a processing unit 104 connected to an antenna 105 via a transceiver 106, a memory unit 107, a microphone 108, a keyboard 109 and a speaker 110. The processing unit 104 is also connected to the display 102 and the camera 130.

No detailed description will be presented regarding the specific functions of the different blocks of the telephone 100. In short, however, as the person skilled in the art will realize, the processing unit 104 controls the overall function of the functional blocks in that it is capable of receiving input from the keyboard 109, audio information via the microphone 108, images recorded via the camera 130 and receive suitably encoded and modulated data via the antenna 105 and transceiver 106. The processing unit 104 is also capable of providing output in the form of sound via the speaker 110, images via the display 102 and suitably encoded and modulated data via the transceiver 106 and antenna 105.

Figure 2A:
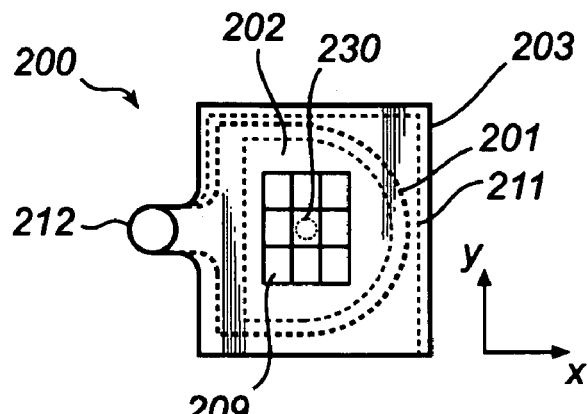
FIGS. 2a, 2b, 2c and 2d show a mobile communication terminal according to the invention with rotational capability from top views and side views.
Figure 2B:
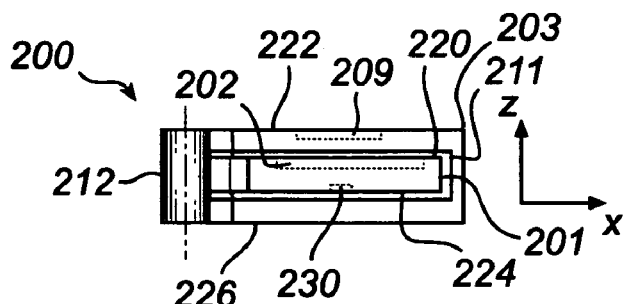
Figure 2C:
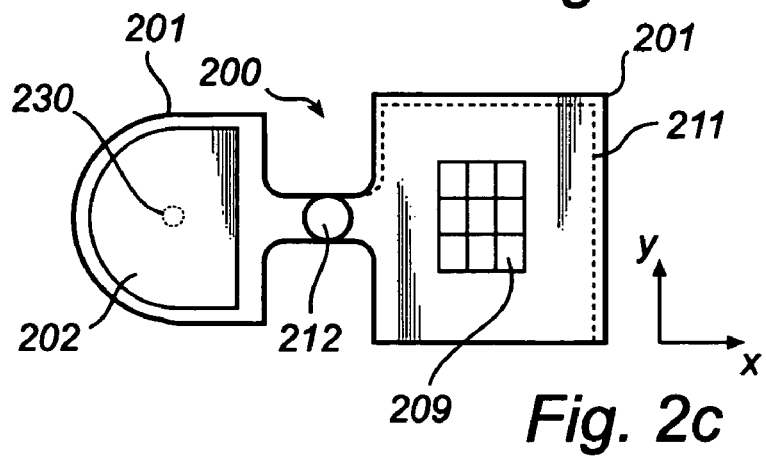
Figure 2D:
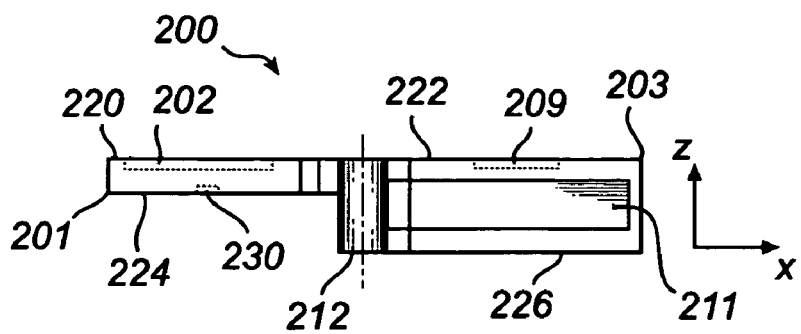

FIGS. 2a to 2d show an embodiment of a mobile communication terminal 200 according to the invention with rotational capability. FIGS. 2a and 2c are top views while FIGS. 2b and 2d are side views. A first body part 201 comprising a display 202 and a camera 230 is attached to a second body part 203 through a rotational joint 212. The second body part comprises a cavity 211 and a keyboard 209. The first body part has a front surface 220 and a back surface 224, and the second body part has a front surface 222 and a back surface 226.

FIGS. 2a and 2b show the mobile communication terminal 200 in a closed state, defining a first relative position for the first 201 and second 203 body parts. The first body part 201 is contained within the cavity 211 of the second body part 203, protecting the display 202 and the camera 230. FIGS. 2c and 2d show the mobile communication terminal 200 in an opened state, defining a second relative position for the first 201 and second 203 body parts. The first body part 201 is now located outside the cavity 211 of the second body part 203, allowing the camera 230 to be used for recording images and allowing the display 202 to be viewed.

In the closed state (FIGS. 2a and 2b), the front surface 220 of the first body part 201 and the front surface 222 of the second body part 203 are not in a common plane, which is particularly apparent in FIG. 2b. In the opened state (FIGS. 2c and 2d), the front surfaces 220, 222 are in a common plane, which is particularly apparent in FIG. 2d. The shift from the closed to open state is by way of relative rotation of the first 201 and second 203 body parts around the rotational joint 212, the joint being provided such that it provides a relative shift in a z direction, as will be discussed further below in connection with FIGS. 8 and 9. Although not shown, an alternative configuration can be provided such that the back surface 224 of the first body part 201 and the back surface 226 of the second body part 203 are in a common plane in the opened state.

Figure 3A:
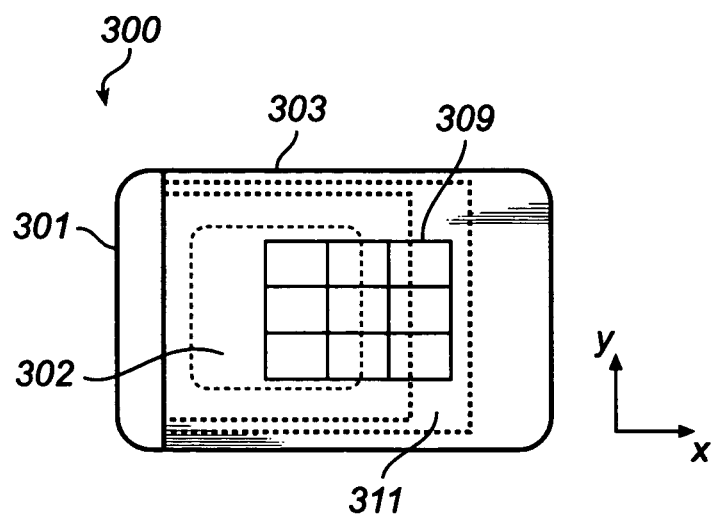
FIGS. 3a, 3b, 3c and 3d show a mobile communication terminal according to the invention with linear movement capability from top views and side views.
Figure 3B:
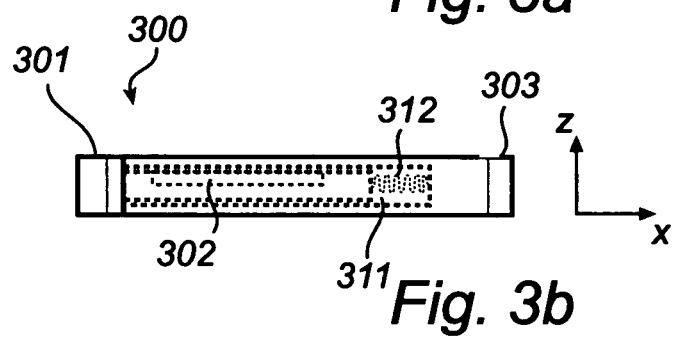
Figure 3C:
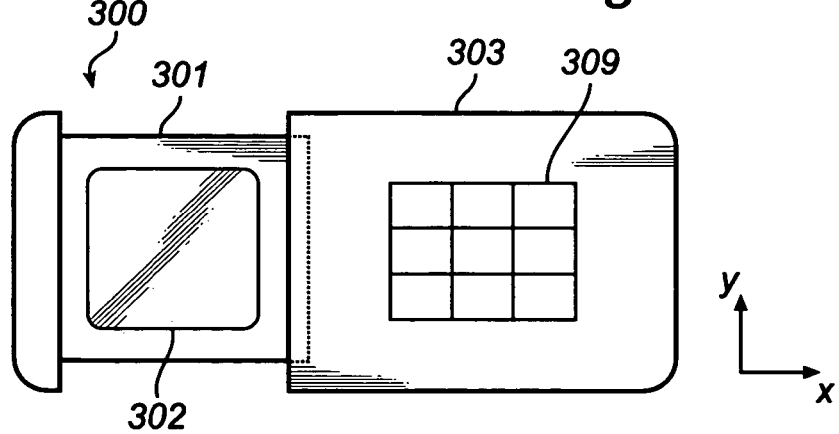
Figure 3D:
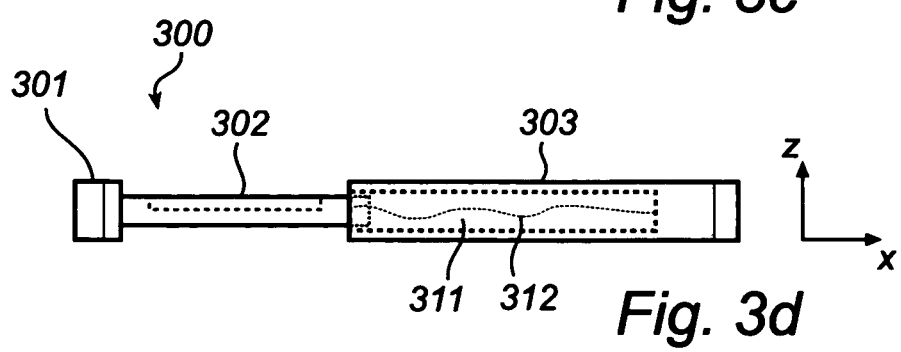

FIGS. 3a to 3d show an embodiment of a mobile communication terminal 300 according to the invention with rotational capability. FIGS. 3a and 3c are top views while FIGS. 3b and 3d are side views. A first body part 301 comprising a display 302 is arranged to slide along a direction x and is in FIG. 3a located within a cavity 311 in a second body part 303. The second body part 303 also comprises a keyboard 309. The first body part 301 and the second body part 303 are electrically connected through a flexible cable 312.

FIGS. 3a and 3b show the mobile communication terminal 300 in a closed state, the first body part 301 being contained within the cavity 311 of the second body part 303, protecting the display 302. FIGS. 3c and 3d show the mobile communication terminal 300 in an opened state, the first body part 301 being located outside the cavity 311 of the second body part 303, allowing the display 302 to be viewed. When linear movement is used to open and close the mobile communication terminal 300, the flexible flat cable 312 is arranged in the cavity 311, such that the cable is long enough to reach to the first part 301 in the opened state and flexible enough to fold and fit in the cavity 311 even when the mobile communication terminal 300 is in the closed state.

Turning now to a description of different embodiment alternatives for a rotational configuration of the present invention as shown in FIGS. 4 to 6. By defining the closed state as the display body part having an angle of 0 degrees in the x-y plane relative to the main body part, in opened state the display body part can be at 180 degrees, 90 degrees, −90 degrees, 270 degrees or any other angular measurement relative the main body part.

Figure 4A:
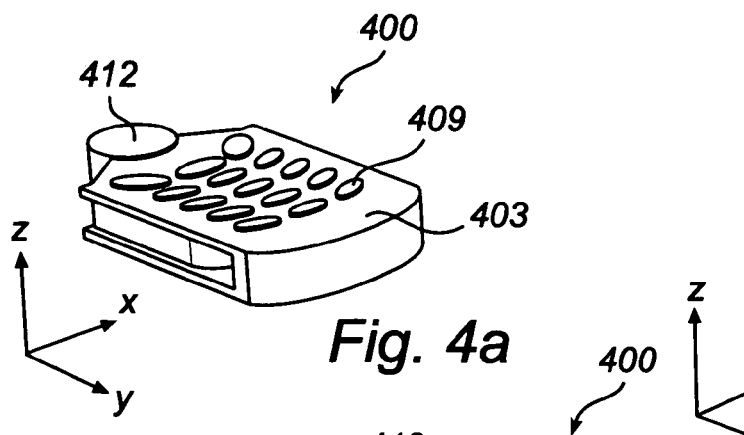
FIGS. 4a, 4b and 4c show perspective views of different states of a mobile communication terminal according to the invention with 180 degree rotational capability.
Figure 4B:
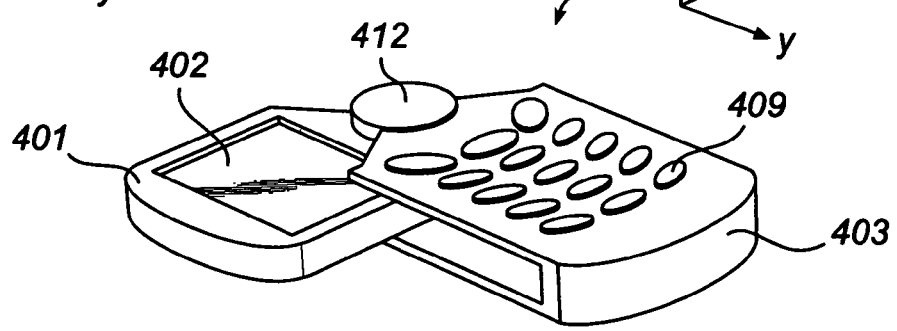
Figure 4C:
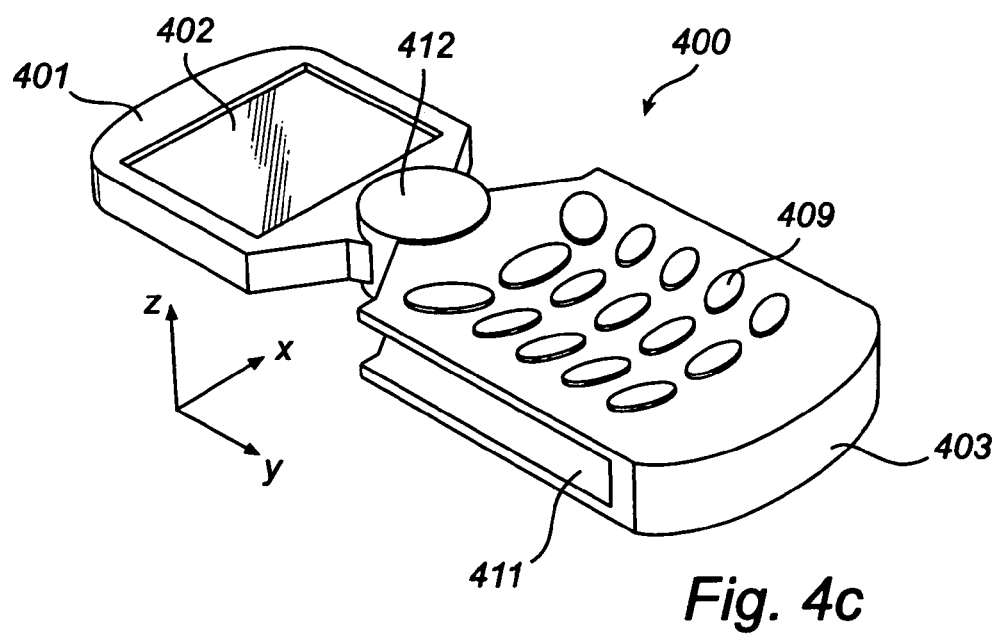

FIGS. 4a, 4b and 4c show perspective views of different states of a mobile communication terminal 400 according to yet another embodiment of the invention with 180 degree rotational capability. A first body part 401 comprising a display 402 is attached to a second body part 403 through a joint 412. The second body part comprises a cavity 411 and a keyboard 409.

FIG. 4a shows the mobile communication terminal 400 in a closed state, with the first body part being contained within the cavity 411 of the second body part 403. FIG. 4b shows the mobile communication terminal 400 in a semi-opened state and FIG. 4c shows the mobile communication terminal 400 in an opened state where the display 402 is fully visible.

Figure 5A:
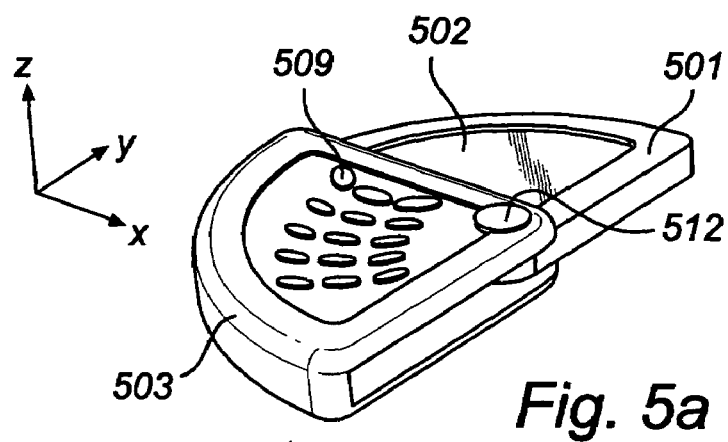
FIGS. 5a, 5b and 5c show perspective views of different states of a mobile communication terminal according to the invention with 90 degree rotational capability.
Figure 5B:
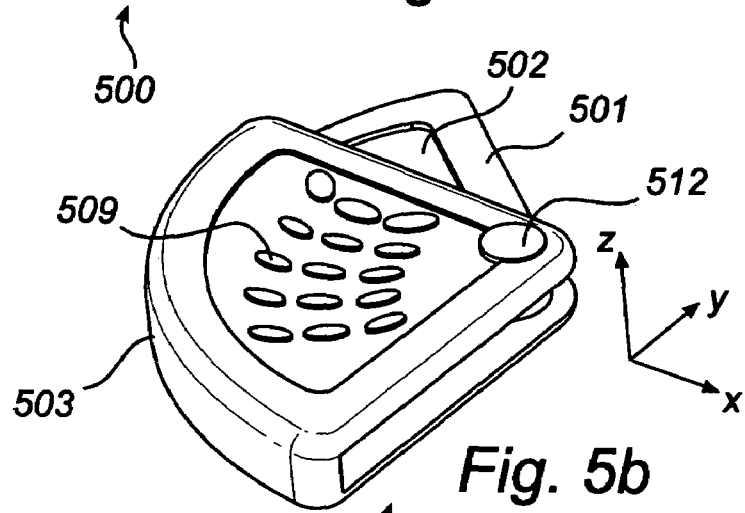
Figure 5C:
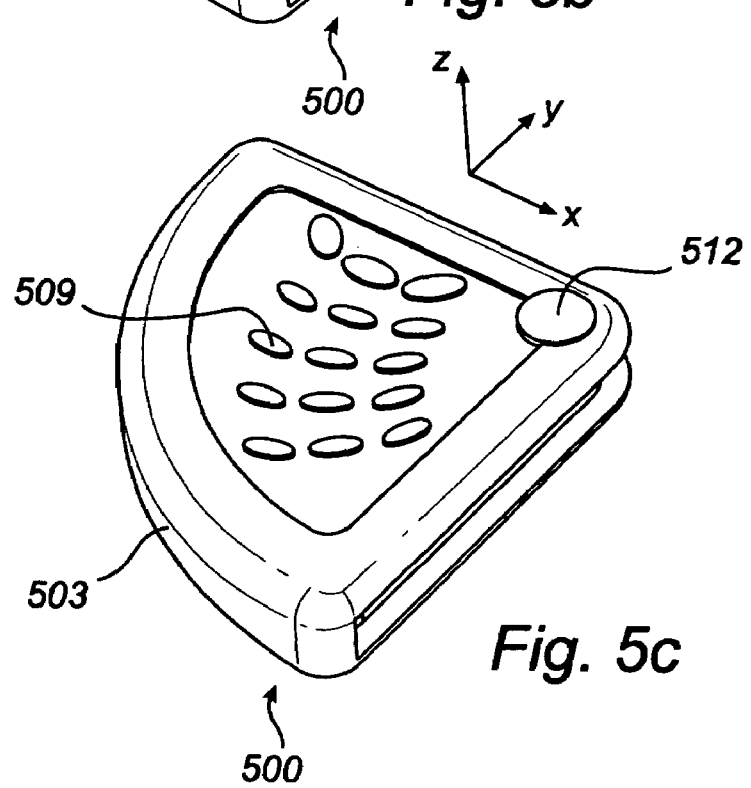

FIGS. 5a, 5b and 5c show perspective views of different states of a mobile communication terminal 500 according to yet another embodiment of the invention with 90 degree rotational capability. A first body part 501 comprising a display 502 is attached to a second body part 503 through a joint 512. The second body part comprises a keyboard 509.

FIG. 5c shows the mobile communication terminal 500 in a closed state, with the first body part being contained within the cavity (not shown) of the second body part 503. FIG. 5b shows the mobile communication terminal 500 in a semi-opened state and FIG. 5a shows the mobile communication terminal 500 in an opened state where the display 502 is fully visible.

FIGS. 6a, 6b, 6c, 6d and 6e show perspective views of different states of a mobile communication terminal 600 according to yet another embodiment of the invention with positive and negative 90 degree rotational capability. A first body part 601 comprising a display 602 is attached to a second body part 603 through a joint 612. The second body part comprises a cavity 611 and a keyboard 609.

Figure 6A:
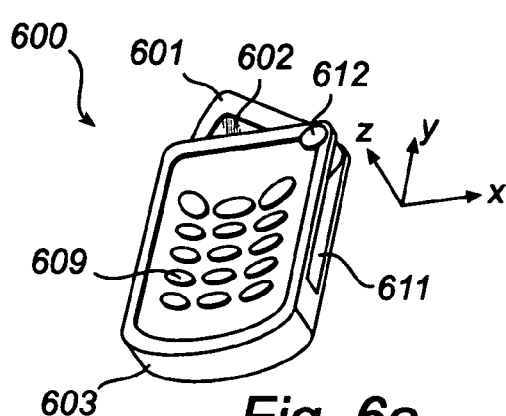
FIGS. 6a, 6b, 6c, 6d and 6e show perspective views of different states of a mobile communication terminal according to the invention with positive and negative 90 degree rotational capability.
Figure 6B:
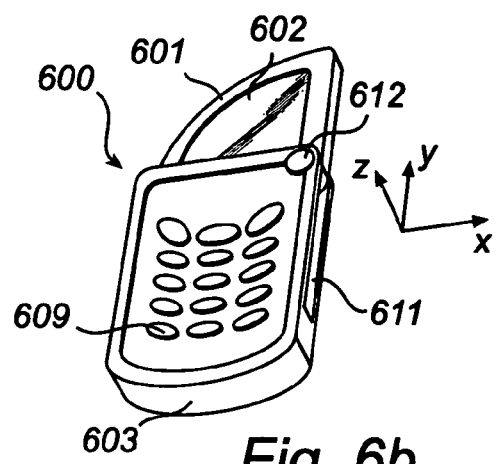
Figure 6C:
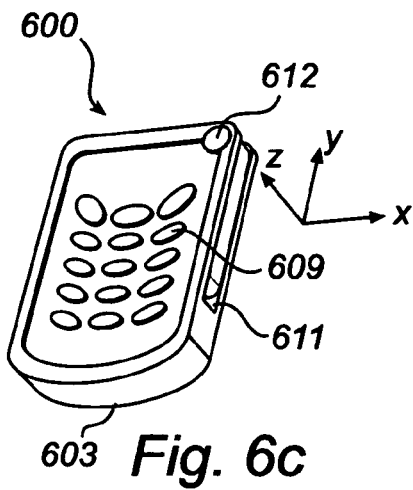
Figure 6D:
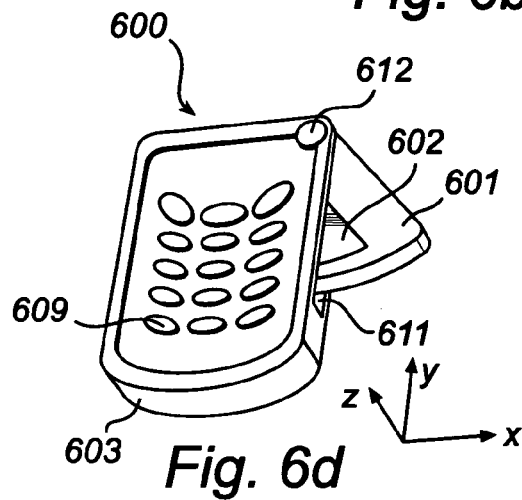
Figure 6E:
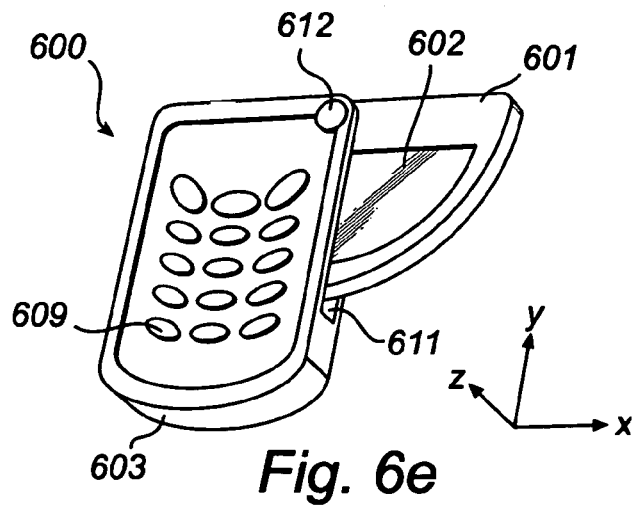

FIG. 6c shows the mobile communication terminal 600 in closed state, with the first body part being contained within the cavity (not shown) of the second body part 603. FIG. 6a shows the mobile communication terminal 600 in semi-opened state and FIG. 6b shows the mobile communication terminal 600, in opened state for a 90 degree rotation where the display 602 is fully visible. FIG. 6d shows the mobile communication terminal 600 in semi-opened state and FIG. 6e shows the mobile communication terminal 600 in opened state for a negative 90 degree rotation where the display 602 is fully visible.

Figure 7A:
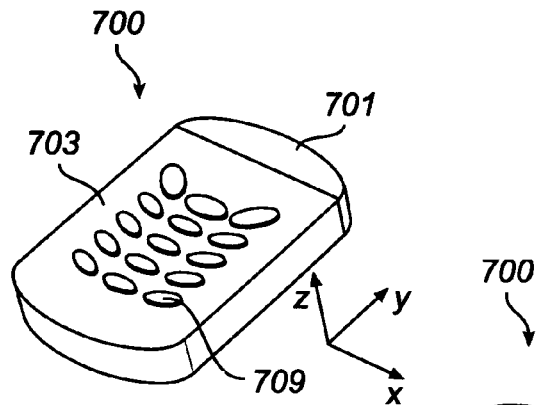
FIGS. 7a, 7b and 7c show perspective views of different states of a mobile communication terminal according to the invention with linear movement capability.
Figure 7B:
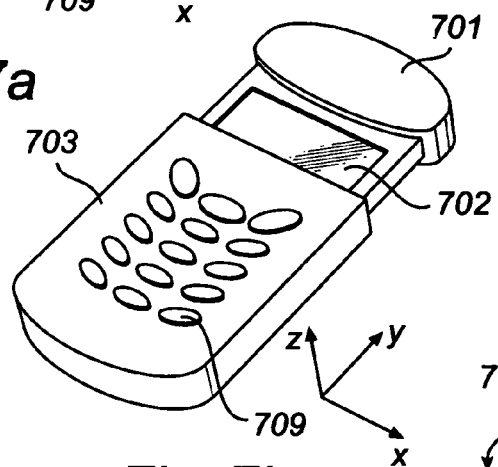
Figure 7C:
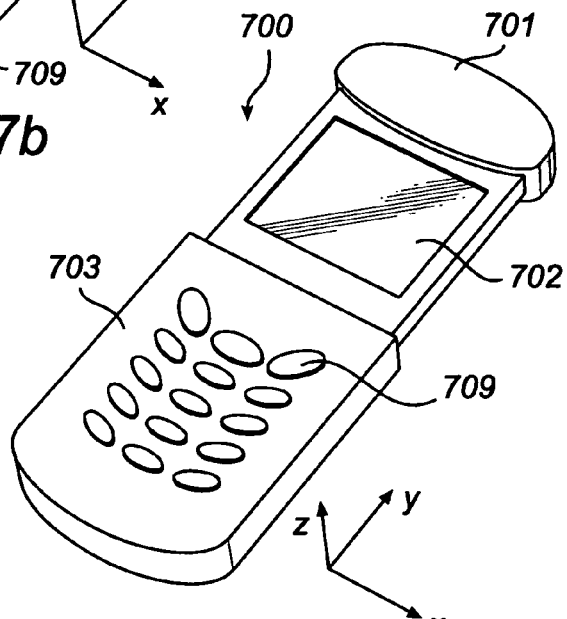

FIGS. 7a, 7b and 7c show perspective views of different states of a mobile communication terminal 700 according to yet another embodiment of the invention with linear movement capability. A first body part 701 comprising a display 702 is attached to a second body part 703. The second body part comprises a cavity (not shown) and a keyboard 709.

FIG. 7a shows the mobile communication terminal 700 in closed state, with the first body part being contained within the cavity (not shown) of the second body part 703. FIG. 7b shows the mobile communication terminal 700 in semi-opened state and FIG. 7c shows the mobile communication terminal 700 in opened state where the display 702 is fully visible.

Figures 8A, 8B:
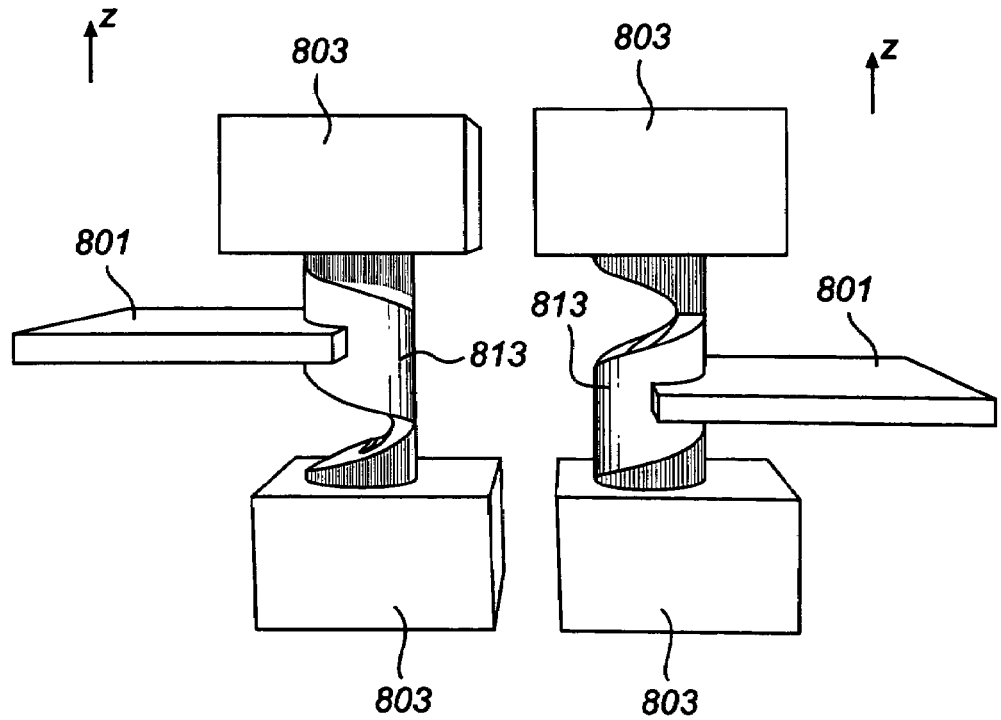
FIGS. 8a and 8b show two perspective views of different rotational states of a joint in a mobile communication terminal according to the present invention with rotational capability.

FIGS. 8a and 8b show two perspective views of different rotational states of a joint in an embodiment of a mobile communication terminal according to the present invention with rotational capability, e.g. the embodiments shown in FIGS. 2, 4, 5 and 6. A first body part 801 is connected to a shaft comprising a threaded screw 813 which in turn is connected to a second body part 803. FIG. 8a shows in a first rotational state the arrangement of the first body part 801 and the second body part 803. FIG. 8b shows in a second rotational state the arrangement of the first body part 801 and the second body part 803, where it can be seen that the first body part 801 has been shifted along the z axis relative the second body part 803 compared to FIG. 8a.

Figures 9A, 9B:
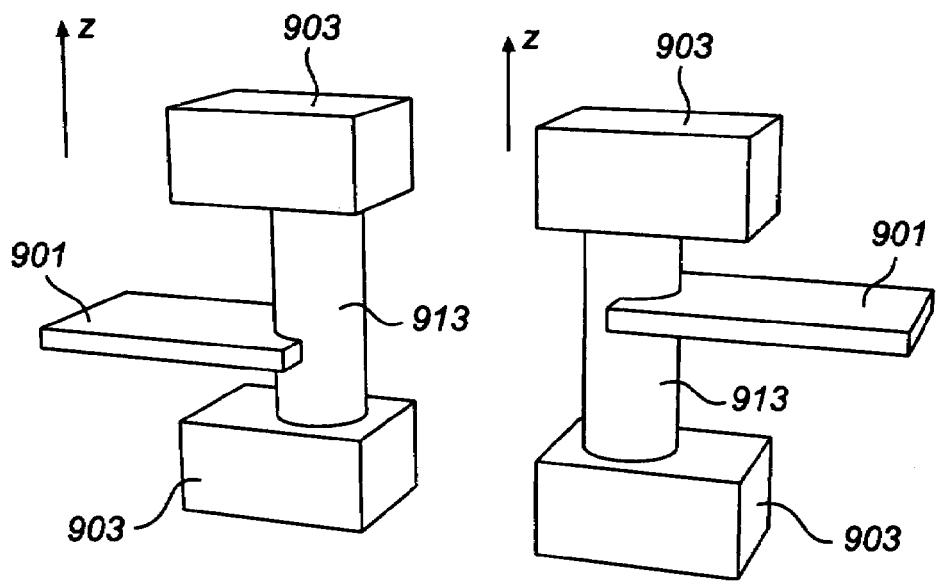
FIGS. 9a and 9b show two perspective views of different rotational states of a joint in a mobile communication terminal according to the present invention with rotational capability.

FIGS. 9a and 9b show two perspective views of different rotational states of a joint in an embodiment of a mobile communication terminal according to the present invention with rotational capability. A first body part 901 is connected to a shaft 913 which in turn is connected to a second body part 903. FIG. 9a shows in a first rotational state the arrangement of the first body part 901 and the second body part 903. FIG. 9b shows in a second rotational state the arrangement of the first body part 901 and the second body part 903, where it can be seen that the first body part 901 has been shifted along the z axis relative the second body part 903 compared to FIG. 9a.

Figure 10:
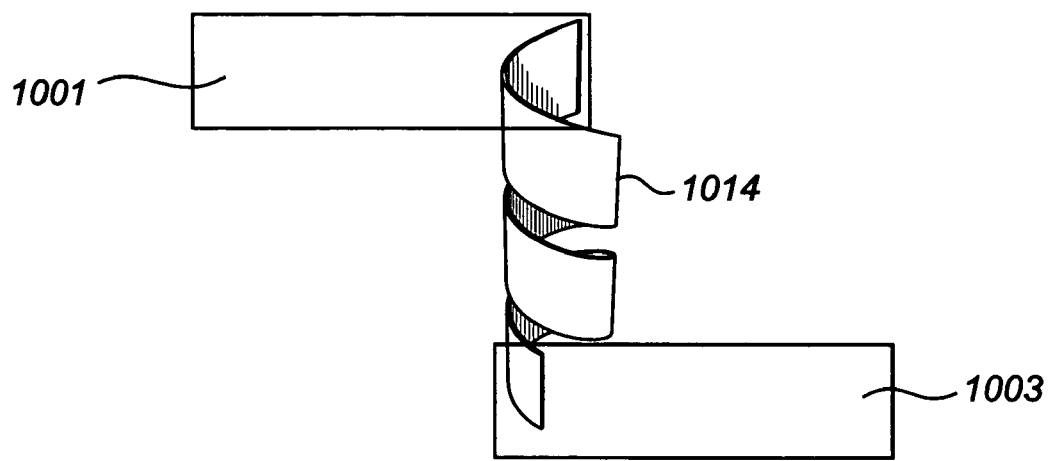
FIG. 10 shows a perspective view of an electrical connection in a mobile communication terminal according to the invention with rotational capability.

FIG. 10 shows a perspective view of the electrical connection of an embodiment of a mobile communication terminal according to the invention with rotational capability. A first body part 1001 is electrically connected to a second body part 1003 by means of a cable 1014.

When rotation is used to open and close the mobile communication terminal, the electric connection between the first body part 1001 and the second body part 1003 is realized with a flat cable 1014 arranged in a spiral, providing low mechanical stress on the cable during radial movement.

The invention claimed is:

1. A mobile communication terminal comprising:
a first body part having an upper face and a lower face;
a second body part having an upper face and a lower face, said second body part constructed to support the first body part, said second body part being further constructed having a cavity capable of containing the first body part between said upper and lower faces of said second body part; and
a mechanical support constructed to connect the first body part to said second body part for movement between a first relative position and a second relative position, said mechanical support further constructed to provide movement of the first body relative to the second body both in a plane parallel to the upper and lower face of the second body and transverse the upper and lower of the second body;
wherein the first relative position is such that at least part of the first body part is contained in the cavity of the second body part, and the second relative position is such that the first body part is substantially outside the cavity of the second body part; and
further wherein, in the second relative position, the first body part is positioned either with its upper face in a common plane with the upper face of the second body part or the first body part is positioned with its lower face in a common plane with the lower face of the second body part.

2. A mobile communication terminal according to claim 1, wherein the mechanical support comprises a shaft having a threaded screw with a non-linear pitch, wherein said shaft supports the first body part on the second body part to provide for pivotal and axial movement thereon about an axis transverse to said upper and lower faces of the second body part between the first and second relative positions.

3. A mobile communication terminal according to claim 2, wherein the shaft is constructed having at least one eccentric end.

4. A mobile communication terminal according to claim 1 wherein the mechanical support is constructed to provide relative sliding motion between the first body part and the second body part to allow a shift between the first and second relative positions.

5. A mobile communication terminal according to claim 1, wherein spring means are arranged in connection with the first and the second body part, said spring for storing energy during shifting the body parts from the second to the first relative positions, said spring means further configured to release energy during a shift from the first to the second relative positions and thereby facilitating the shift.

6. A mobile communication terminal according to claim 1, wherein the first body part comprises a display.

7. A mobile communication terminal according to claim 1, wherein the first body part comprises a camera.

* * * * *